United States Patent [19]
Ford et al.

[11] Patent Number: 5,219,256
[45] Date of Patent: Jun. 15, 1993

[54] TUBE MOUNTING APPARATUS INCLUDING A WIRE RETAINER

[75] Inventors: John E. Ford, Schenectady; Albert Myers, Mont, both of N.Y.

[73] Assignee: General Electric Company, Schenectady, N.Y.

[21] Appl. No.: 882,903

[22] Filed: May 14, 1992

Related U.S. Application Data

[60] Division of Ser. No. 854,747, Mar. 19, 1992, Pat. No. 5,154,049, which is a continuation of Ser. No. 550,564, Jul. 10, 1990, abandoned.

[51] Int. Cl.$^5$ .............................................. F16B 21/18
[52] U.S. Cl. ................................. 411/530; 411/517; 411/522
[58] Field of Search .............. 411/530, 522, 353, 517, 411/516

[56] References Cited

U.S. PATENT DOCUMENTS

| 990,847 | 5/1911 | Crandall | 411/530 X |
|---|---|---|---|
| 1,205,883 | 11/1916 | Gay | 411/522 X |
| 1,964,331 | 6/1934 | Place | 411/530 X |
| 2,512,690 | 6/1950 | Smith et al. | 411/516 X |
| 3,048,339 | 8/1962 | Tapleshay | 411/530 X |
| 3,270,124 | 8/1966 | Rawls et al. | 411/530 X |

FOREIGN PATENT DOCUMENTS

| 1291563 | 3/1969 | Fed. Rep. of Germany | 411/530 |
|---|---|---|---|
| 287753 | 3/1928 | United Kingdom | 411/522 |

Primary Examiner—Rodney M. Lindsey
Attorney, Agent, or Firm—Nixon & Vanderhye

[57] ABSTRACT

A mounting assembly for use with crossfire tubes connected between plural combustors arranged in a spaced relation about a turbine, wherein the assembly includes a wire retainer formed to connect a crossfire tube end to the retainer by compressive side loading of the tube and further formed to connect the tube to a mounting base by compressive forces in a different direction between the base and the retainer wire.

5 Claims, 2 Drawing Sheets

TUBE MOUNTING APPARATUS INCLUDING A WIRE RETAINER

This is a division of application Ser. No. 07/854,747, filed Mar. 19, 1991, now U.S. Pat. No. 5,154,049 which in turn was a continuation of Ser. No. 07/550,564, filed Jul. 10, 1990, now abandoned.

BACKGROUND AND SUMMARY OF THE INVENTION

The invention relates to mounting apparatus including wire retainers for use with crossfire or crossover ignition tubes commonly found in combustion systems for gas turbines and the like. The exemplary retainer embodiment disclosed is of a shape to cooperate with a mounting base in the vicinity of a crossfire tube end and when in place results in locking the mounting base and crossfire tube to the retainer by way of compressive forces.

The use of adjacent combustors in a gas turbine with interconnecting crossfire tubes is generally well known as indicated in a commonly assigned White, U.S. Pat. No. 4,249,372 issued Feb. 10, 1981. As indicated therein, a typical cross ignition assembly comprises tubular members extending between aligned openings in adjacent combustors that are held in place by means which position the opposite ends of the tubular members or crossfire tubes in fluid communication with the adjacent combustion chambers. The purpose of the crossfire tubes is that of providing for the ignition of fuel in one combustor chamber from ignited fuel in an adjacent combustor without providing igniter means in each combustor. Such crossfire tubes also serve the purpose of equalizing to some extent the pressures between combustion chambers. As indicated in the White patent, it is important that such crossfire tubes be mounted so that the tube ends are positioned accurately as well as being mounted in a manner to reduce vibration which has been found to cause wear in the cross ignition assembly. The objects of the White invention are accomplished in part through the use of a leaf spring for retaining the outer end of each crossfire tubular member in its operative position by effecting a cantilever support for each tube end.

Briefly summarized, we have discovered that the exemplary embodiment of our wire retainer which can be easily formed with resilient wire or rod of standard size and composition will provide firm support against axial movement of the crossfire tube through the use of compressive side loading provided by the wire retainer. Additionally, the retainer is firmly attached to the mounting base by an additional compressive force caused by the manner in which the retainer is formed and the manner in which it is engaged by the mounting base on both sides of the crossfire tube. Additionally, the illustrative embodiment of our new wire retainer only requires a base in the vicinity of the crossfire tube and does not require a base extended to the full length of the retainer.

BRIEF DESCRIPTION OF THE DRAWINGS

These as well as other objects and advantages of this invention will be more clearly appreciated by carefully studying the following detailed description of a presently preferred exemplary embodiment of this invention in conjunction with the accompanying drawings in which.

DETAILED DESCRIPTION OF THE DRAWINGS

Figure 1:
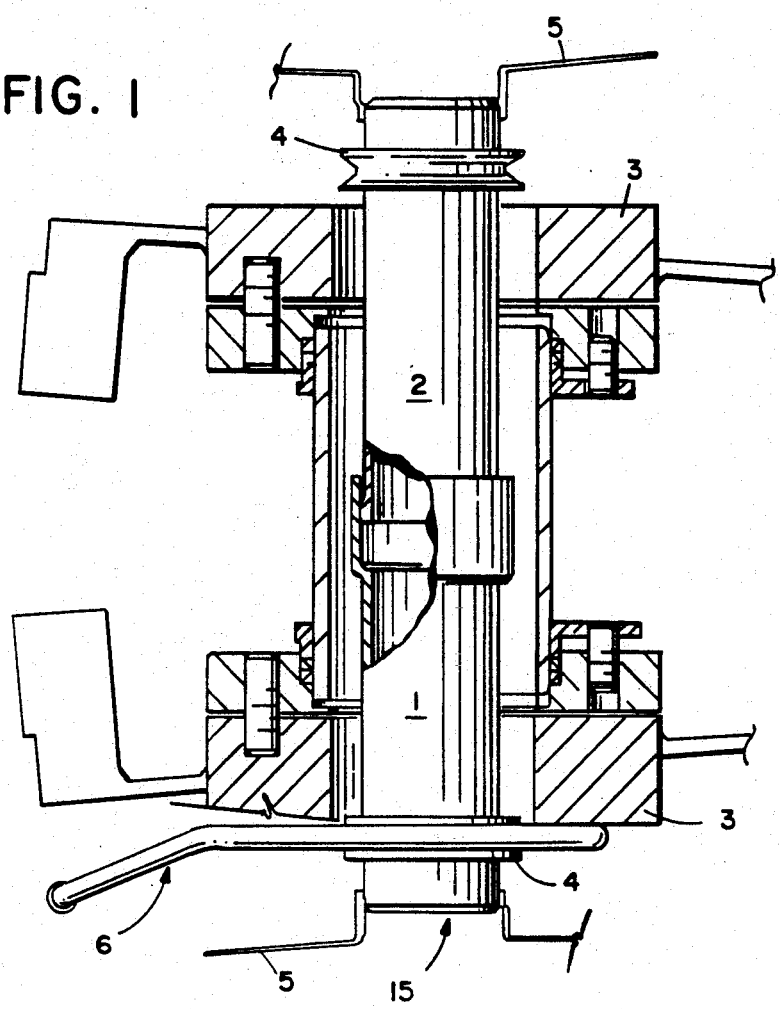
FIG. 1 is a partial sectional view and a partially broken away view of a generalized cross ignition assembly illustrating a wire retainer connecting a crossfire tube to a mounting base and a combustion liner of a combustion chamber.

Typically a crossfire tube may comprise a unitary tubular member extending between aligned openings in adjacent combustors or may take the more conventional form illustrated in FIG. 1 wherein a pair of coaxial telescoping crossfire tube members 1 and 2 each has an outer end disposed in an annular opening 15 of a combustor element such as combustion liner 5. The ends are held in place by a mounting arrangement including a base element 3, a wire retainer 6 and a collar 4 which is fixed to each of the crossfire tube members.

Figure 2:
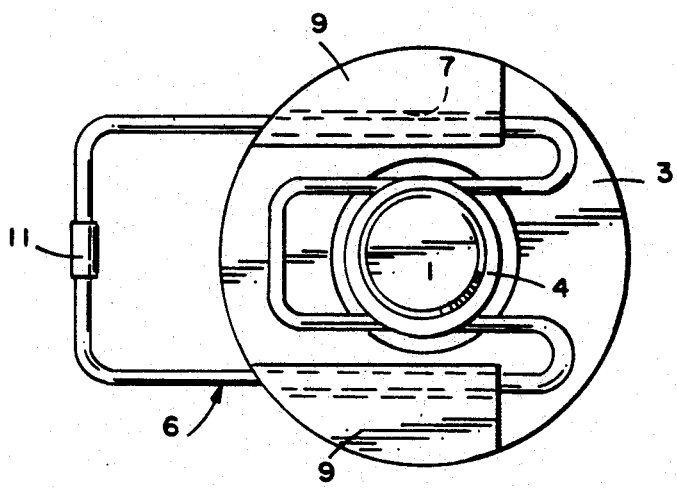
FIG. 2 is a partial bottom view of the cross ignition assembly of FIG. 1 illustrating further connection details between the wire retainer and the mounting base as well as the connection of the retainer to the crossfire tube.
Figure 3:
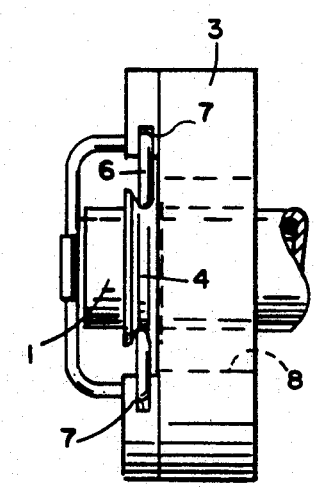
FIG. 3 is a partial side view of the elements of FIG. 2.

One of the mounting arrangements for positioning an end of a crossfire tube at a combustion chamber is illustrated in FIGS. 2 and 3. The mounting base 3 which is attached to the combustor by flange means or the like (not illustrated in FIGS. 2 and 3) includes a bore 8 for receiving the end of a crossfire tube member and its associated collar 4. The base additionally includes slots 7 formed in the raised portions 9 of the mounting base. The highest dimension of the slots 7 is approximately equal to the diameter of the wire used in retainer member 6 so as to closely receive the retainer as well as compressing the retainer on both sides by the mounting base slot height, as will be subsequently explained.

As illustrated in FIG. 3, collar 4 is fixed to crossfire tube member 1 for example at an appropriate distance such that the tube end will extend into the combustor at a proper distance for forming a connection but without extending too far into the combustion gas flow paths thus avoiding damage to the crossfire tubes in the form of end burning. Collar 4 includes a V-shaped groove for receiving the wire retainer 6 as the open end of the retainer slides into the V-grooves on the side of the crossfire tube.

As will be appreciated by those skilled in the art, the mounting arrangement illustrated in FIGS. 2 and 3 may be assembled or disassembled by hand, would require no special installation tools, and would cause the crossfire tube to be centered with respect to the retainer.

Figures 4, 5:
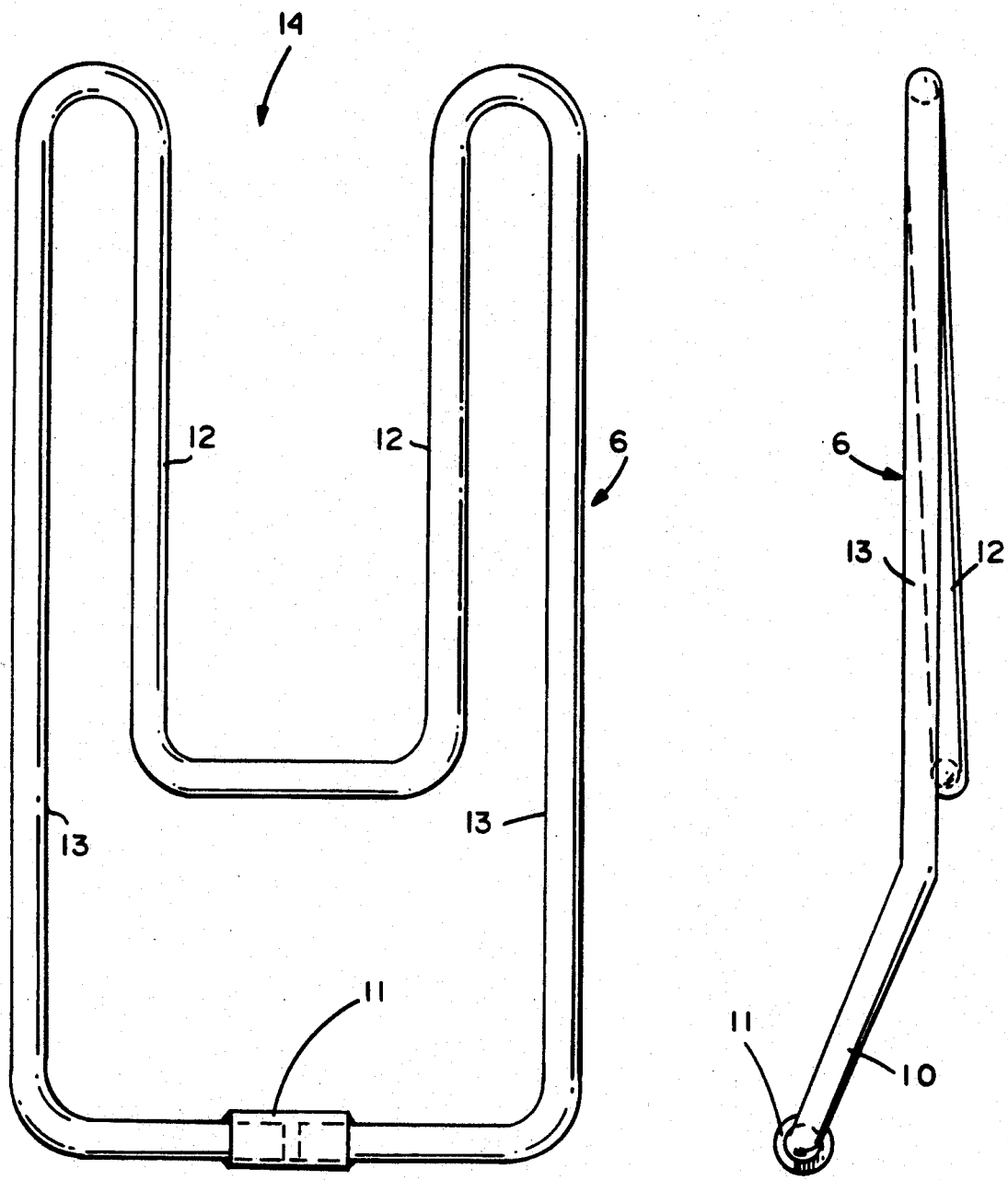
FIG. 4 is a plan view of the wire retainer.
FIG. 5 is a side view of FIG. 4 illustrating further details of the retainer.

Further advantages of the mounting arrangement may be realized from a consideration of the wire retainer as illustrated in FIGS. 4 and 5, for example. The retainer illustrated therein may in an exemplary embodiment be made of resilient wire or rod of conventional size (0.3125 inch diameter) and material (X-750 wire) and is easily producible in the closed resilient wire loop shape illustrated in FIG. 4 through the inclusion of six bends, which form the retainer into the illustrated compact shape. Two additional bends are required to obtain the features illustrated in FIG. 5. Although the ends of the wire are shown in the drawings joined by a coupling device 11, they can also be joined by butt welding, for example.

Again referring to FIG. 4, the linear distance between the inner legs 12 forming the open end or central opening 14 of the retainer is made to be slightly smaller than the inner diameter of the V-shaped groove of the crossfire tube collar illustrated in FIG. 3, such that when the retainer is fully engaged, the compressive side loading of the wire retainer controls the radial and axial movement of the crossfire tube.

The side view shown in FIG. 5 illustrates that the inner and outer legs 12 and 13, respectively of the wire retainer are not coplanar, but are offset in the manner shown by a distance which is approximately equal to the thickness of the wire. When the retainer is fully engaged with the crossfire tube and mounting base, as previously mentioned, the bottom of the retainer is compressed or flattened on both sides by the mounting base slot height and the radial surface of the base element. Such compression results in locking the wire retainer rather firmly to the mounting base. Since the compressive side loading of the wire retainer on the tube collar 4 tends to control the radial and axial movement of the crossfire tube and the retainer is locked to the base, the end result is a crossfire tube locked in all directions when using a retainer of the disclosed design.

Stated differently, the shape of our retainer was chosen to create two independent forces wherein the first force produced by the side loading of the wire on the collar is a centering force holding the crossfire tube to the retainer. The second force resulting from the chosen shape wherein the inner and outer legs of the retainer are not copolanar creates a compressive force when the retainer is engaged which will hold the retainer and the captured tube to the mounting base.

As further illustrated in FIG. 4 and in particular FIG. 5, the raised portion 10 of the retainer forms a convenient handle for use when installing and removing the retainer. Such handle structure is useful because although the combined effect of the aforementioned forces is sufficiently great as to prevent the parts from becoming loose during operation of the combustors, the forces act in different directions and their combined effect is small enough for the crossfire tube retainer to be installed or removed by hand, thus requiring no special installation tools. Additionally, those skilled in the pertinent art will note that since the forces are not required to act over the full length of the retainer wire, but in fact act in a relatively compact area, the retainer of our disclosed design requires a base only in the vicinity of the crossfire tube and, therefore, requires a base which is relatively small in comparison to prior art cantilevered or plate retainers.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

For example, as indicated above, the specific environment in which the disclosed apparatus is contemplated for use in mounting apparatus for crossfire tubes in gas turbines. However, as will be appreciated by the artisan, such mounting apparatus may be more generally applied for mounting a tube end in a fluid opening of a combustion system.

What is claimed is:

1. A resilient retaining device, said device comprising:
   inner elements forming a central opening at one end thereof;
   a first connection member connecting the other ends of said inner elements together;
   outer elements;
   a second connection member for connecting said outer elements at one end thereof;
   a third connection member for connecting a first of said inner elements at said one end to the other end of a first one of said outer elements;
   a fourth connection member for connecting a second of said inner elements at said one end to the other end of a second of said outer elements, and
   wherein said inner elements are parallel with each other, said outer elements are parallel with each other and said inner and outer elements are oriented in different planes.

2. The resilient retaining device of claim 1 wherein said device is a closed resilient wire or rod loop bent to form said elements and connection members.

3. The resilient retaining device of claim 2 wherein said closed resilient wire or rod loop comprises six bends and said wire or rod has a diameter of about 0.3125 inch.

4. The resilient retaining device of claim 3 wherein said second connection member includes means for joining the ends of said wire or rod which is bent to form the closed loop.

5. The resilient retaining device of claim 1 wherein said second connection member is connected to said outer elements so that said outer elements and the second connection member are oriented in different planes and in use said second connection member forms a handle for installing or removing the resilient retaining device.

* * * * *